C. R. UNDERHILL.
INDICATING MECHANISM.
APPLICATION FILED JAN. 13, 1917.

1,386,915.

Patented Aug. 9, 1921.
2 SHEETS—SHEET 1.

Inventor
Chas. R. Underhill
By his Attorney
Chas. F. Dane

C. R. UNDERHILL.
INDICATING MECHANISM.
APPLICATION FILED JAN. 13, 1917.
1,386,915.
Patented Aug. 9, 1921.
2 SHEETS—SHEET 2.
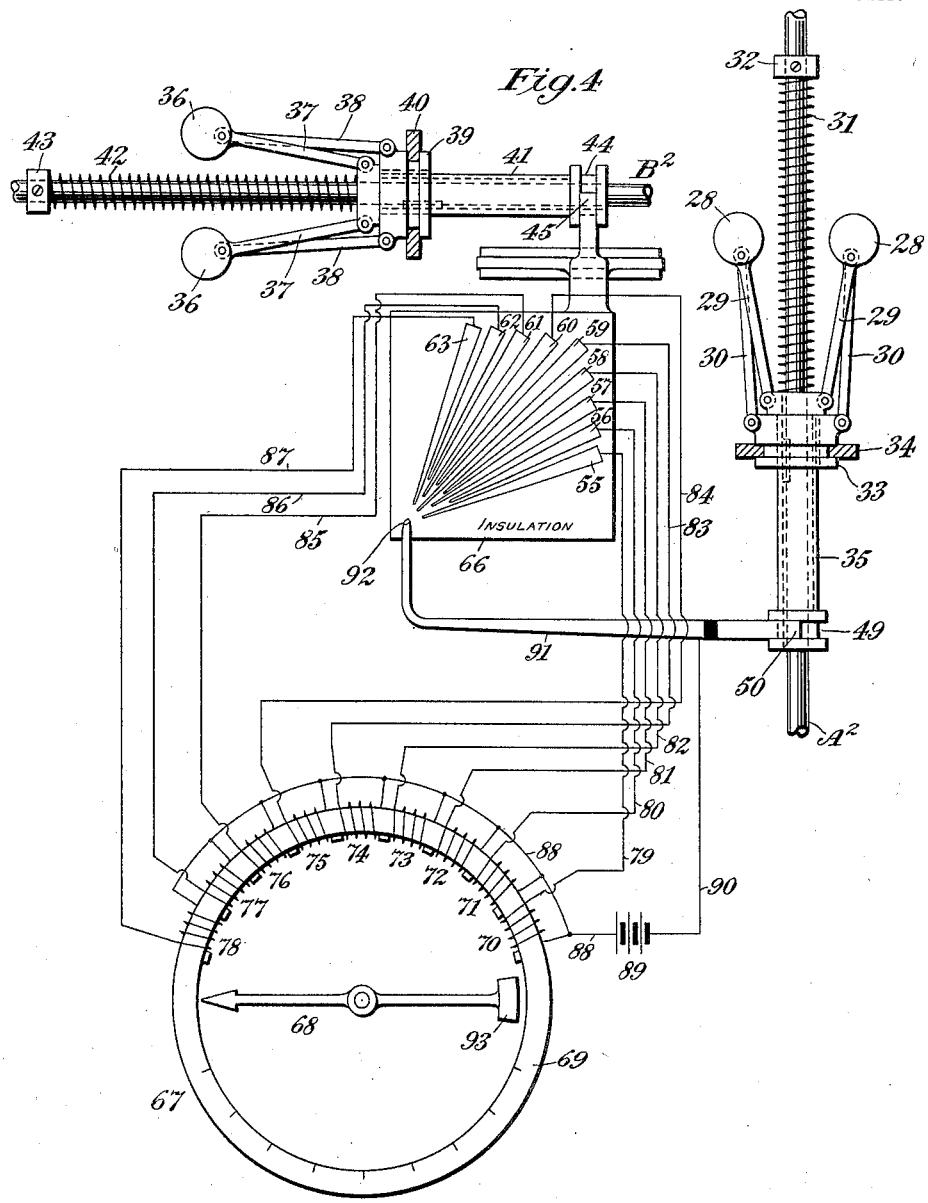

UNITED STATES PATENT OFFICE.

CHARLES R. UNDERHILL, OF NEW HAVEN, CONNECTICUT.

INDICATING MECHANISM.

1,386,915.   Specification of Letters Patent.   Patented Aug. 9, 1921.

Application filed January 13, 1917. Serial No. 142,193.

*To all whom it may concern:*

Be it known that I, CHARLES R. UNDERHILL, a citizen of the United States, and resident of New Haven, in the county of New Haven and State of Connecticut, have invented a certain new and useful Indicating Mechanism, of which the following is a specification.

This invention relates to indicating apparatus, and particularly to apparatus for indicating the relations of moving elements, and its principal object is to provide an indicating apparatus wherein the speed relations of two moving elements are compared during the period of operation.

The invention is especially adapted for indicating the relations of the speeds of rotating elements, such as shafts and spindles, which are arranged to rotate at the same and and different speeds, and to indicate the relation or ratio of the two speeds numerically, as 2 to 1, 3 to 1, etc.

Operating means are preferably joined to each moving member and interconnected in such a way as to show the numeric relations of the movements of the compared members on a suitable device, such as a dial or scale, preferably employing to and fro movements to indicate changes in speed relations.

The operating means connected to the separate members may be of any suitable type such as electrical or mechanical means, and can also consist of combinations of such means or mechanism, or of other suitable type, such as electrical or mechanical indicating means.

The typical means I employ for accomplishing the above objects, together with other advantageous features of my improved indicating device are illustrated in the accompanying drawings, in which—

Fig. 4 is a diagram illustrating another modification of my invention.

Similar characters refer to like parts in all figures of the drawings.

Figure 1:
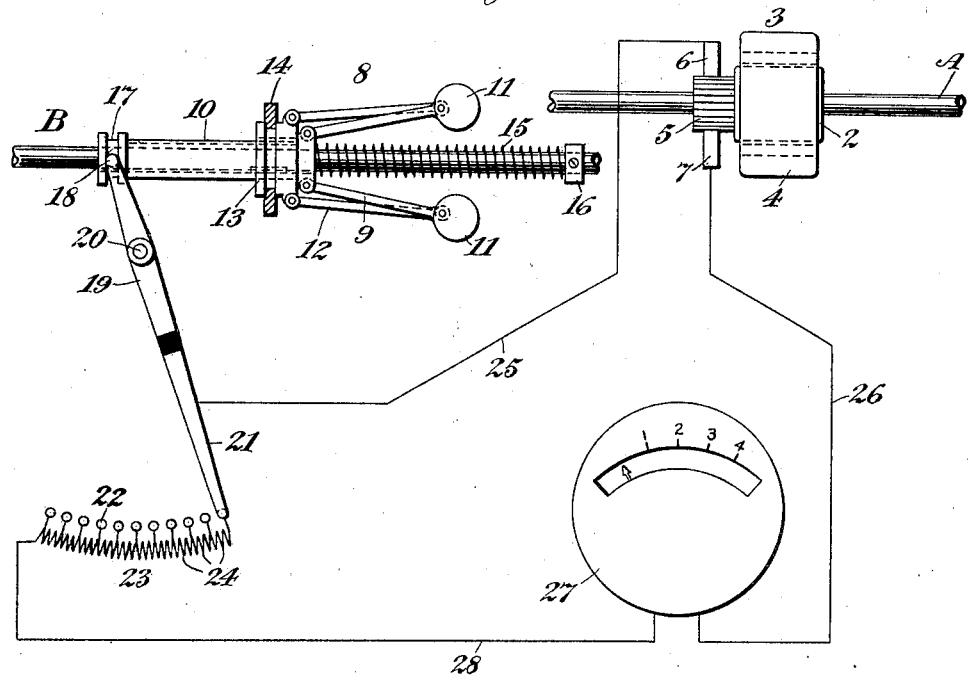
Figure 1 is a diagram illustrating one form of my improved indicating device.

In Fig. 1 of the drawings I have illustrated a form of my invention for indicating the relation or ratio between the rotative speeds of two revolving shafts such as A and B. The means for indicating the said relation or ratio are controlled by the joint operation of devices on the two shafts, and the operation of said devices is effected by the rotation of the respective shafts. The said devices are interconnected differentially in such a manner as to give readings on a suitable index.

In the mechanism illustrated in said figure I have shown secured to the shaft A, the rotating element or armature 2, of an electric generator or dynamo such as 3, which in this case is provided with a permanent field magnet 4, a commutator 5, and brushes 6 and 7. The armature is provided with suitable windings connected with the commutator segments.

When the brushes 6 and 7 are connected in a suitable circuit, and the armature or rotatable element of the generator is revolved, an electric current will flow through the circuit connected to said brushes and the electromotive force E of said circuit will vary as the speed of rotation of the shaft A.

Connected to the shaft B are operating means coöperating with the mechanism joined to shaft A in influencing the indicating means of the apparatus. The said operating means consists of an isochronous governor such as 8, which comprises two levers 9, pivoted to a sliding sleeve 10 and having revolving weights 11. Two links 12 are movably connected to the weights 11 and also to a grooved collar 13, which is held in position laterally by a fixed member 14. The sleeve 10 is connected to the shaft by a key and spline and the collar 13 is also joined to the sleeve 10 by a key and spline, so that the sleeve 10 is adapted to move to and fro along the shaft B and be driven thereby and also drive the collar 13. A spring 15 bearing on a collar 16 normally holds the sleeve 10 against the collar 13. The sleeve 10 is provided with a groove 17 which engages the pin 18 on the end of the lever 19, which is pivoted at 20 and has an insulated contact finger 21 at one end. The said contact finger 21 is adapted to move over, and make contact with fixed contacts 22, of the resistance 23, and to introduce into the generator circuit one or more of the resistance coils 24.

The brush 6 of the generator is joined to a conductor 25, which connects to the contact finger 21, and the brush 7 is joined by a conductor 26 to the electrometer or ammeter 27. The ammeter 27 is connected in turn by the conductor 28 to the left hand end of the resistance 23.

The operation of the foregoing mechanism is as follows:

Assuming that the shaft A is rotated at a given speed, and the shaft B at another speed, which for example is half as great as that of A, then an electric current will be sent through the circuit comprising the brush 6, conductor 25, contact finger 21, resistance 23, conductor 28, ammeter 27, conductor 26, and brush 7. The revolving weights 11, will move outward and by means of the levers 9 and links 12 will move the sleeve 10 to the right, and in turn move the lever 19 to vary the resistance 23.

As the distances traveled by the sleeve 10 are substantially equal for equal changes of speed, the amount of resistance introduced in the generator circuit will also be equal for equal changes in speed. The voltage generated by the dynamo 3 is always the same for a given speed, and the hand of the ammeter will always be moved the same amount for the same speed. Consequently when a constant dynamo current due to a given speed of the shaft A is reduced by a constant resistance due to a given speed of the shaft A, the ammeter pointer will always go to the same place.

When proportionate increases or decreases are made in the speeds of either shaft, the relations of voltage and resistance increase and decrease in the same degree, so that if B=20 when the speed of A is 100 and R=10 when the speed of B=50, then $\frac{E}{R}=2$ and the speed relation is 2:1.

Other ratios follow the same laws, as for example, if the speed of A=300, E=60, and if speed of B=75, R will equal 15, and the ratio is 4:1.

Figure 2:
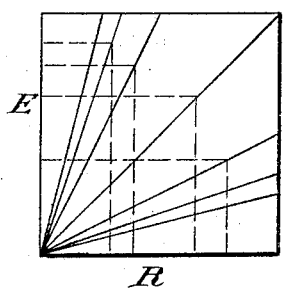
Fig. 2 is a chart relating to the operation of the mechanism of Fig. 1.

In the chart shown in Fig. 2, the horizontal components are the voltage values and the vertical components are resistance values, while the inclined lines or resultants indicate current values or ratios.

Figure 3:
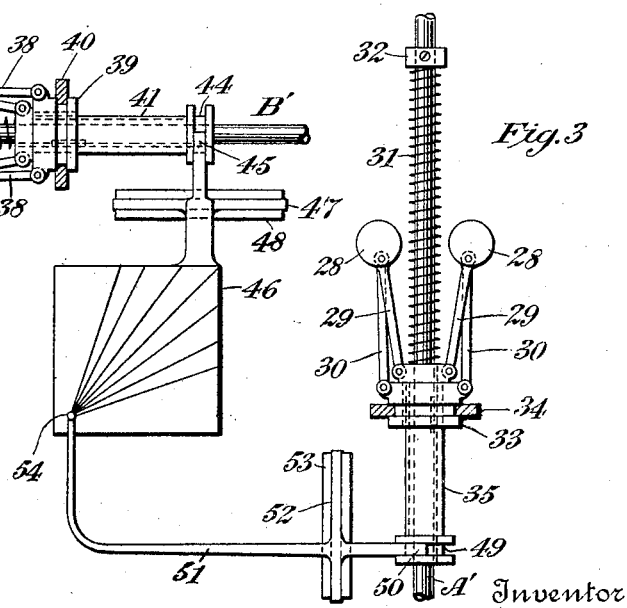
Fig. 3 is a diagram showing a modified form of my improved indicating device.

In the modification illustrated in Fig. 3, purely mechanical operating means are shown, and consist of centrifugal governors connected to the shafts A′ and B′ respectively. That on the shaft A′ consists of rotatable weights 28, levers 29, links 30, spring 31, collar 32, grooved collar 33, member 34 to hold collar 33, and the sleeve 35 slidable on the shaft A′.

The operating means connected to the shaft B′ consists of the rotatable weights 36, levers 37, links 38, grooved collar 39, member 40 to hold collar 39, sleeve 41, spring 42 and collar 43. Bearing in a groove 44 in the sleeve 41 is a fork 45 connected to an index plate 46 by suitable supports, to which also is secured a bearing member 47, movable in suitable ways 48. Bearing in a groove 49 in the sleeve 35 is a fork 50 on an arm 51, having a bearing member 52, movable in guides 53, and on the upturned end of the arm 51 is an index disk 54.

As the shafts A′ and B′ revolve, the weights 28 and 36 move outward, and the sleeves 35 and 41 are moved by the levers 29 and 37, and links 30 and 38, causing the index plate 46 and disk 54 to assume new positions corresponding to the respective speeds of the said shafts A′ and B′. The inclined lines on the index plate indicate the speed ratios of the shafts, and are pointed out by the index member 54. If the member 54 lies on the 45° line the ratio is 1:1, if on the next above the ratio is 1½:1 with A′ revolving faster than B′, if on the second one below, the ratio is 1:2 with a moving half as fast as B. If on the third below, the ratio is 1:3, etc.

In the form of my invention shown in Fig. 4, the shafts $A^2$ $B^2$ are provided with governors like those of Fig. 3, but the index plate differs in having instead of lines, inclined contact strips 55 to 63, mounted on a plate of insulation 66. An indicating member 67 is provided having a pointer 68, a soft steel ring 69, coils 70 to 78, connected respectively to the contact strips 55 to 63 by conductors 79 to 87, at one end, and to a common conductor 88 at their other ends, which conductor 88 is in turn connected to the negative terminal of the source of electrical supply shown as the battery 89. The positive terminal of the battery is connected by the condutor 90 to the insulated arm 91, which has a contact point 92. The pointer 58 is provided with a soft steel bar 93 at one end.

When the shafts $A^2$ and $B^2$ revolve, the insulated plate 66 is moved to the left and the contact point 92 is moved upward, making contact with one or other of the contact strips, 55 to 63, which closes the circuit from the battery through the wire 90, the arm 91, contact point 92, contact strip such as 61, conductor 85, coil 76, conductor 88, to the battery 89. The bar 93 on the pointer will be attracted and move to a position opposite the coil 76, and the other end of the pointer will then point to a mark indicating the speed ratio of the shafts $A^2$ and $B^2$.

What I claim is:—

1. Indicating mechanism embodying the combination with two rotary members, and means acted upon by certain referred to agencies adapted to coöperate with each other connected therewith, of a centrifugal device associated with one of said rotary members, and responsive thereto, for variably controlling one of said coöperating means, the coöperative movements of said means being effective for denoting the ratio which the speeds of said rotary members bear to each other.

2. Indicating mechanism embodying the combination with two rotary members, and means acted upon by certain referred to agencies adapted to coöperate with each other connected therewith, of a centrifugal device associated with one of said rotary members, and responsive thereto, for variably controlling one of said coöperating means, and an indicating means responsive differentially for denoting the ratio which their speeds bear to each other.

3. Indicating mechanism embodying the combination with two rotary members, of coöperating means comprising two sets of elements, each of which sets is responsive directly to the movements of a separate rotary member, a centrifugal device associated with one of said rotary members for variably controlling one set of elements, the relative movements of said elements being effective for denoting the ratio which the speeds of said rotary members bear to each other.

4. Indicating mechanism embodying the combination with two rotary members, of coöperating means comprising two sets of elements, each of which sets is connected to a separate rotary member, a centrifugal device mounted on each rotary member for operating each set of elements relative to each other, for denoting the ratio which the speeds of said rotary members bear to each other.

5. Indicating mechanism embodying the combination with two moving members, of operating means connected therewith which include an electrical generator responsive to one of said members and a resistance controller responsive to the other of said members, and which operating members are associated with electrical indicating means, and in conjunction therewith are effective for showing the ratio which the speeds of said members bear to each other.

6. Indicating mechanism embodying the combination with two moving members, of operating means connected therewith which include an electrical generator connected to one of said members and a resistance controller connected to the other member, and which generator and controller are responsive to said members differentially and are associated with electrical indicating means for showing the ratio which the speeds of said members bear to each other.

7. Indicating mechanism embodying the combination with two rotary members, of operating means connected therewith which include a rotary electrical generator responsive to one of said rotary members and a mechanically operated electrical resistance controller responsive to the other rotary member, and which generator and controller are effective for controlling the movements of a current indicator reading in terms of speed ratios.

8. Indicating mechanism embodying the combination with two rotary members, of operating means connected therewith which include an electrical generator joined to one of said members, a centrifugal governor joined to the other member, and an electrical resistance controller connected to the centrifugal device, and which operating members are associated with an electrical indicating device for denoting the ratio which the speeds of said members bear to each other.

9. Indicating mechanism embodying the combination with two rotary members, of operating means connected therewith which include an electrical generator joined to one of said members, and responsive to the movements thereof, a generator circuit connected to the electric generator, a plurality of resistance coils in said circuit, a current indicator reading in speed ratios also connected in said circuit, and a resistance controller connected to the other rotary member and responsive to the movements of said member, and effective for varying the resistance of the generator for influencing the current indicator in denoting speed ratios.

10. Indicating mechanism comprising the combination with two rotary members, of operating means connected therewith which include an electrical generator joined to one of said members and responsive to the movements thereof, a generator circuit connected to the generator, a plurality of resistance coils in said circuit, a current indicator reading in speed ratios also connected in said circuit, a centrifugal governor connected to the other rotary member, and a resistance controller connected to the governor so as to be responsive to the movements of the same, and effective to vary the resistance of the generator circuit.

11. Two movable members susceptible of moving at the same or different speeds, two speed responsive devices, one associated with each movable member, an indicator adapted to indicate speed ratios and provided with relatively movable indicating parts, means whereby changes in the respective speed responsive devices caused only by variations of speed of the movable members apply forces tending to produce relative movements of the indicating parts in opposite senses, substantially as described.

12. Two rotatable members susceptible of moving at the same or different speeds, two speed responsive devices, one associated with each rotatable member, one of said speed responsive devices being of centrifugal type, an indicator calibrated in terms of speed ratios and provided with relatively movable indicating parts, means for converting the energy of motion of the centrifugal speed responsive device developed by variations in the speed of one movable member into force tending to produce relative movement of the indicating parts in one sense, and means whereby changes in the other speed responsive device caused only by variations of speed of the other movable member applies force and tends to produce relative movement of the indicating parts in the opposite sense.

Signed at New York, in the county of New York, and State of New York, this 11th day of January, A. D. 1917.

CHARLES R. UNDERHILL.

Witnesses:
W. R. WARNER,
CHAS. D. KING.